United States Patent [19]

Geno et al.

[11] Patent Number: 4,946,144

[45] Date of Patent: Aug. 7, 1990

[54] EXTERNAL CLAMPING BAND FOR AIR SPRING

[75] Inventors: Wayne H. Geno, Cicero; Keith E. Hoffman, Atlanta, both of Ind.

[73] Assignee: Bridgestone/Firestone, Inc., Akron, Ohio

[21] Appl. No.: 330,673

[22] Filed: Mar. 30, 1989

[51] Int. Cl.⁵ .............................................. F16F 9/04
[52] U.S. Cl. .............................................. 267/64.27
[58] Field of Search ............. 267/64.19, 64.21, 64.23, 267/64.24, 64.27, 122, 124; 277/209, 212 F, 212 B; 280/711; 16/109, 108; 92/34, 35, 98 R, 98 D

[56] References Cited

U.S. PATENT DOCUMENTS

| | | | |
|---|---|---|---|
| 4,564,177 | 1/1986 | Leonard | 267/64.24 |
| 4,784,376 | 11/1988 | Ecktman | 267/64.27 |
| 4,787,606 | 11/1988 | Geno et al. | 267/64.27 |
| 4,787,607 | 11/1988 | Geno et al. | 267/64.27 |
| 4,793,598 | 12/1988 | Geno et al. | 267/64.21 |

FOREIGN PATENT DOCUMENTS 2650549 12/1977 Fed. Rep. of Germany ... 267/64.27
0167943 7/1987 Japan ............................... 267/64.27

Primary Examiner—Robert J. Oberleitner
Attorney, Agent, or Firm—Ronald Brietkrenz

[57] ABSTRACT

An annular clamping band is concentrically engaged in an interference force-fit relationship with the outer annular surface of the sidewall of an end cap of an air spring primarily intended for use for motor vehicles. The band restricts outward movement and creep of the sidewall and retains an open end of a flexible sleeve which forms the fluid pressure chamber of the air spring, in a compressed state between an annular internal sealing ring and an annular recess formed on the inside surface of the sidewall, to maintain the airtight sealing engagement therebetween. The clamping band is forced axially about the outer surface of the end cap sidewall and is restrained from axial movement therealong by a plurality of retaining ribs projecting outwardly from the top surface of the end cap and by an annular outwardly extending rib on a lower end of the end cap sidewall.

15 Claims, 2 Drawing Sheets

EXTERNAL CLAMPING BAND FOR AIR SPRING

BACKGROUND OF THE INVENTION

1. Technical field

The invention relates to vehicle suspensions and particularly to an air spring having an internal sealing ring which clamps and forms an air-tight seal with an end of a tubular elastomeric sleeve against the inner surface of an end cap. More particularly, the invention relates to such an air spring in which an external clamping band restricts the outward expansion of the end cap sidewall to maintain the air-tight seal with the elastomeric sleeve within the interior of the open end of the end cap.

2. Background Information

Pneumatic springs, commonly referred to as air springs, have been used for motor vehicles for a number of years to provide cushioning between movable parts of the vehicle, primarily to absorb shock loads impressed on the vehicle axles by the wheels striking an object in the road or falling into a depression. The air spring usually consists of a flexible rubber sleeve or bellows containing a supply of compressed fluid and has one or more pistons located within the flexible resilient sleeve. The piston causes compression and expansion of the fluid within the sleeve as the vehicle experiences the road shocks. The spring sleeve is formed of a flexible elastomeric material which permits the piston and end cap to move axially with respect to the sleeve and within the interior of the sleeve.

The ends of the sleeves are sealingly connected to the piston and an opposite end cap, if only one piston is used in the particular spring construction. The clamping of the ends of the flexible sleeve onto the piston and end cap is one of the important and major assembly steps in the production of air springs. Heretofore, the usual manner of sealing the sleeve against the piston and end cap has been by clamping an exteriorly located metal ring against the flexible sleeve which crimps and squeezes the rubber material thereof against a sealing surface of the piston or end cap. These prior art sealing methods and structures require a permanent deformation of the sealing ring and require equipment to supply sufficient pressure to the metal sealing ring to permanently deform the metal upon crimping it radially inwardly against the sealing surface of the adjacent air spring member.

Many of these problems have been eliminated by the improved air spring constructions and sealing arrangements shown in U.S. Pat. Nos. 4,787,607 and 4,793,598, which are assigned to the same assignee as is the present invention. Although the constructions of these specifically mentioned patents are suitable for most air spring applications, it is desirable that for certain applications, especially those using an extremely high internal fluid pressure within the flexible sleeve and where certain design applications eliminate the integral molded hoop-type reinforcement flange which extends about the open end of the end cap, to ensure the integrity of the air-tight clamping engagement of the internal sealing ring with the internal surface of the end cap, and to prevent creep of the end cap material from effecting the seal between the sealing ring and sleeve end, that a positive mechanical device be provided to resist forces which are generated by the inflated sleeve and to prevent creep of the cap material.

Although various types of sealing and clamping arrangements have been devised for forming the air-tight seal between the open ends of the flexible sleeve and with the end cap assembly and/or piston member of an air spring, none of the known prior art is believed to enhance the sealing engagement there between by the use of an external clamping band. Other examples of prior art air spring elastomeric sleeve sealing arrangements, in addition to the above two cited U.S. patents, are shown in U.S. Pat. Nos. 4,784,376; 4,787,606 and 4,564,177. However, none of these prior air springs use or suggest any type of external clamping band to enhance the internal seal.

Therefore the need exists for certain air spring applications, to provide a positive mechanical lock for restricting outward expansion of the annular sidewall of the end cap and possible creep of the cap material, to ensure the integrity of the air-tight seal formed within the open end of the end cap in air spring applications.

SUMMARY OF THE INVENTION

An objective of the invention includes providing an improved air spring construction for motor vehicles, preferably having a piston at one end and an end cap at the other end with an intervening flexible sleeve formed of elastomeric material which forms a fluid pressure chamber between the piston and end cap, in which the sleeve is clamped at one or both ends thereof to the adjacent member by an internal sealing ring, and in which an external clamping band is placed about the outer surface of the end cap sidewall concentric with the internal sealing ring to counteract the forces generated by the inflated elastomeric sleeve on the internal sealing ring and to prevent creep of the end cap material, to ensure the integrity of the air-tight seal formed by the compression of the sleeve end between the sealing ring and internal recessed sealing surface of the end cap adjacent the open end thereof.

A further objective of the invention is to provide such an improved air spring in which the internal sealing ring and external clamping band are formed of metal and the end cap is formed of a high-strength glass reinforced plastic material.

Still another objective of the invention is to provide such an improved air spring in which the internal sealing ring has an outer diameter greater than the diameter of a radially, inwardly extending annular lip formed about the open end of the end cap to provide a positive lock between the end cap and sealing ring and for securely trapping a portion of the flexible sleeve end therebetween.

Another objective of the invention is to provide such an improved air spring in which a plurality of radially extending reinforcing ribs are formed on the top surface of the end cap and extend radially beyond an annular sidewall of the end cap to form a circumferentially extending ledge which prevents upward axial movement of the clamping band once placed in position against the external surface of the end cap, and in which a lower outwardly extending radial lip is formed on the end cap sidewall adjacent the open end to assist in restricting axial movement of the clamping band in the other axial direction.

Still another objective of the invention is to provide such an improved air spring in which the external clamping band has inner and outer circumferential surfaces and opposed end surfaces connected by tapered surfaces, to facilitate the placement of said band about the annular sidewall of the end cap.

These objectives and advantages are obtained by the improved air spring of the invention, the general nature of which may be stated as being an air spring of the type having an end cap for mounting the air spring on a vehicle, a piston member located in a spaced relationship from the end cap, a fluid pressure chamber formed between the end cap and the piston member by a flexible sleeve sealingly connected at opposite ends thereof to the end cap and piston member, and a continuous annular sealing ring located within an open end of the end cap placing an end of the flexible sleeve in a state of compression to form a generally air-tight seal with the sealing ring and an annular sealing surface formed on the interior of an annular sidewall of the end cap, wherein said improvement includes an annular clamping band concentrically engaged with an outer surface of the sidewall of the end cap to restrict outward movement of said sidewall and subsequent loosening of the interior seal of the sealing ring with the flexible sleeve.

BRIEF DESCRIPTION OF THE DRAWINGS

A preferred embodiment of the invention, illustrative of the best mode in which applicants have contemplated applying the principles, is set forth in the following description and is shown in the drawings and is particularly and distinctly pointed out and set forth in the appended claims.

FIG. 1 is an elevational view of the improved air spring having the external clamping band mounted thereon, in a static or at-rest position;

FIG. 2 is an enlarged longitudinal sectional view of the improved air spring shown in FIG. 1;

Similar numerals refer to similar parts throughout the drawings.

DESCRIPTION OF THE PREFERRED EMBODIMENT

Figures 1, 2:
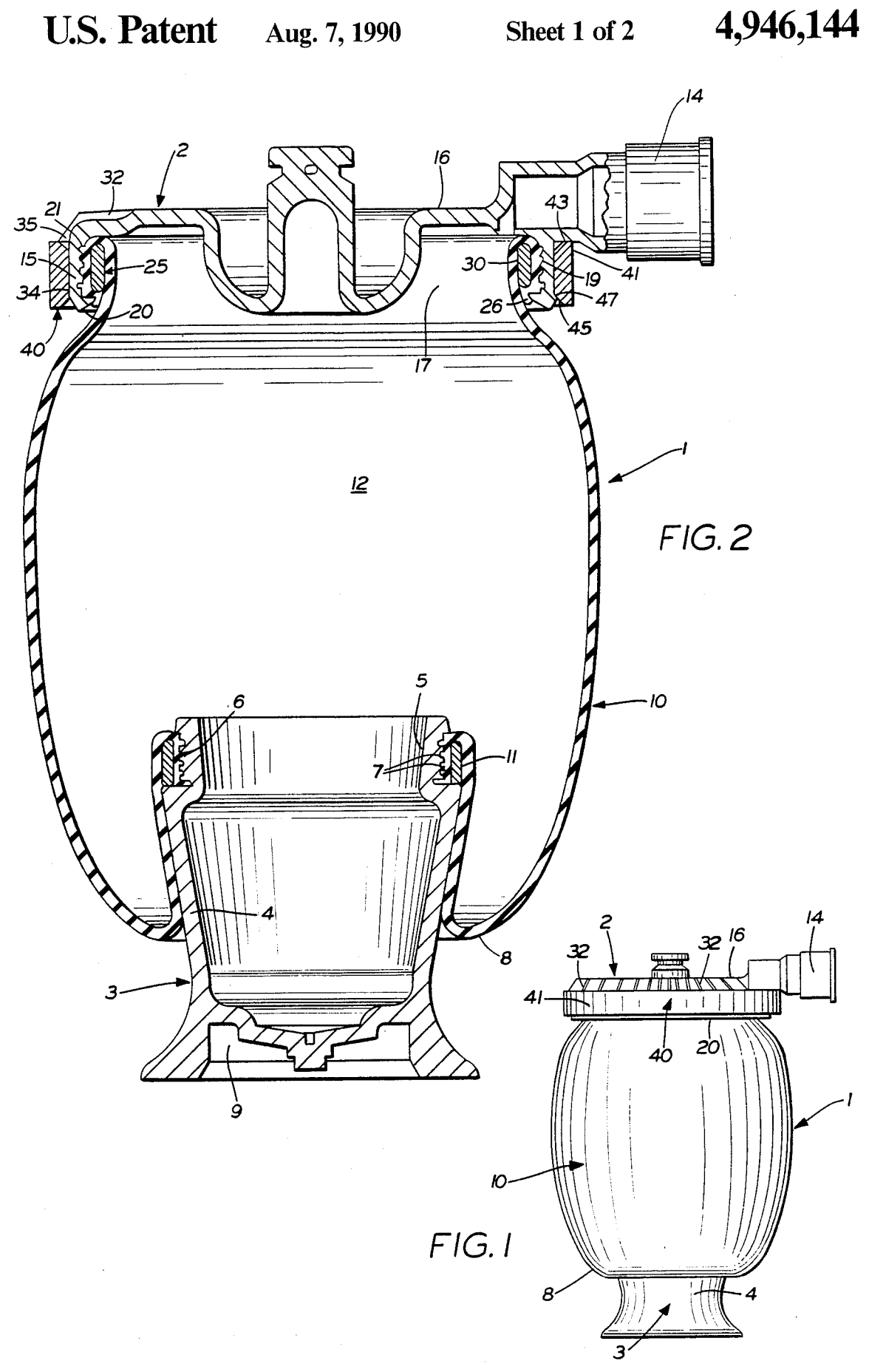
Figure 3:
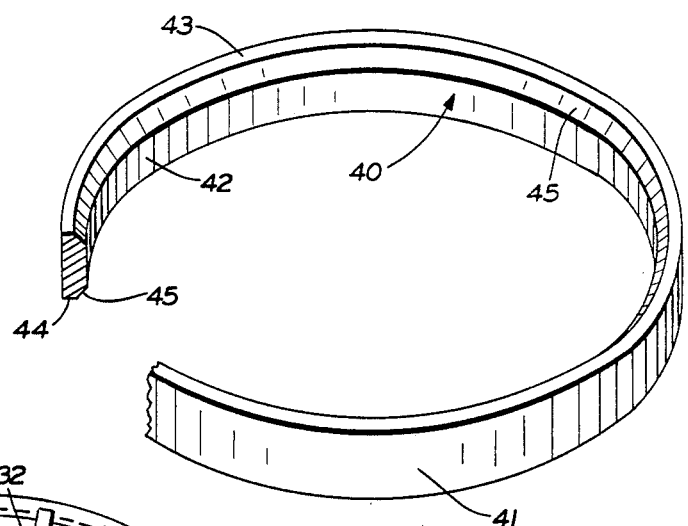
FIG. 3 is an enlarged fragmentary perspective view of the external clamping band.
Figure 4:
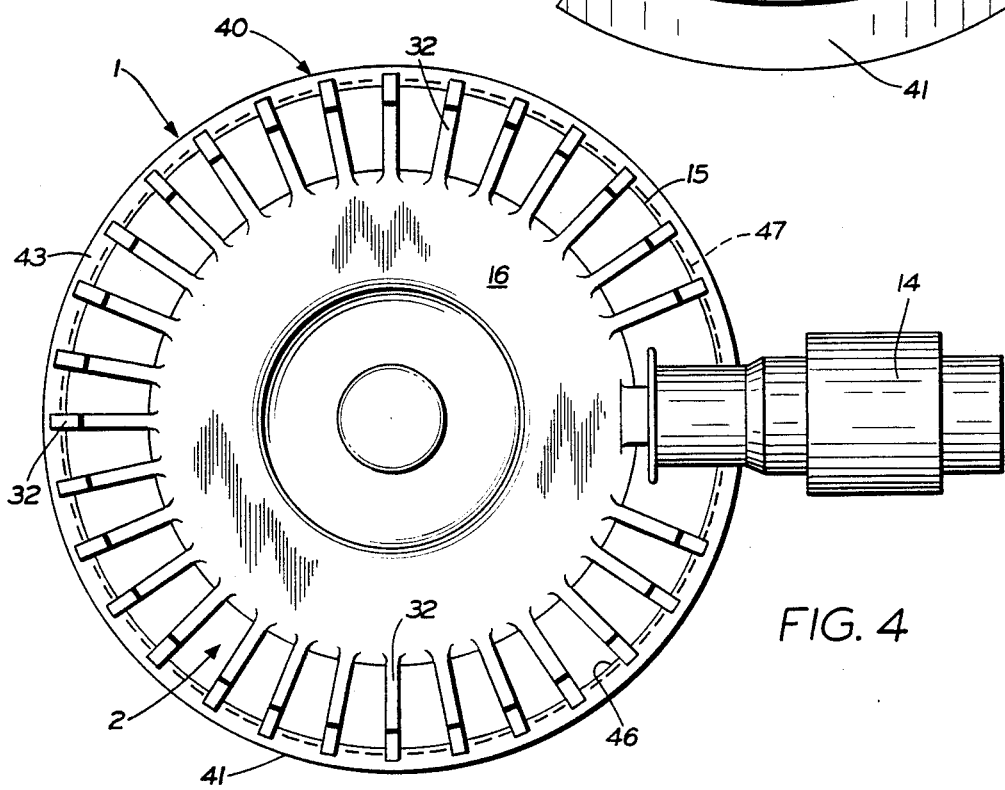
FIG. 4 is a top plan view of the end cap with the clamping band mounted thereon.

The improved air spring of the invention is indicated generally at 1, and is shown in an at-rest position in FIGS. 1 and 2. Air spring 1 includes an end cap member and an opposed piston member indicated generally at 2 and 3, respectively. Piston member 3 has a generally annular tapered sidewall 4, terminating in an upper open end 5, and has an exterior annular clamping surface 6 formed with plurality of grooves 7 extending about open end 5.

One end of a flexible sleeve, indicated generally at 10, is sealingly clamped in a generally air-tight relationship against surface 6 by an exterior sealing ring 11, which is compressed and crimped to seal the sleeve end against surface 6 in a manner well known in the air spring art. Piston member 3 further includes a closed mounting end 9 for attaching the air spring on a portion of a vehicle, also in a manner known to those skilled in the air spring art. The particular configuration and arrangement of piston member 3 may vary without effecting the concept of the invention.

Flexible sleeve 10 has a generally cylindrical configuration and is formed of an elastomeric material generally containing internal reinforcing cords which are trapped within one or two plys of an elastomer. Preferably, at least one end portion 8 of flexible sleeve 10 is in a rolled state when in an at rest position, as shown in FIGS. 1 and 2 to permit piston member 3 to move axially away from end cap 2 without damaging the sleeve.

End cap 2 preferably is formed of a glass reinforced high-strength plastic material and is provided with a solenoid control valve 14 for regulating the fluid pressure within the air spring, and forms no particular part of the present invention. End cap 2 has a cup-shaped configuration, with a cylindrical sidewall 15 terminating in a closed top end wall 16, and having an opposite open end 17 which communicates with interior 12 of flexible sleeve 10. Interior 12 provides the compressed fluid chamber for air spring 1.

An annular recessed sealing surface 19 (FIGS. 2 and 5) is formed on the inner surface of sidewall 15 adjacent open end 17 thereof. Open end 17 of sidewall 15 is defined by a radially inwardly extending retaining lip 20. A plurality of annular grooves 21 preferably are formed in sealing surface 19 to assist in securing the clamped end of sleeve 10 therein.

An annular sealing ring indicated generally at 25 (FIG. 5), is located within the open end of sidewall 15 and clamps a rolled end 26 of flexible sleeve 10 against and within recessed annular sealing surface 19. Sealing ring 25 is a continuous preferably metal member such as aluminum, having rounded top and bottom surfaces 27 and 28 and generally smooth flat outer and inner circumferential surfaces 29 and 30, respectively. In the particular embodiment shown in FIG. 5, the diameter of outer circumferential surface 29 of sealing ring 25 is greater than the inner diameter of retaining lip 20 so that a mechanical lock is formed between the bottom surface 28 of sealing ring 25 and retaining lip 20 and to assist in retaining the engaged portion of the flexible sleeve therebetween.

The particular construction described above with respect to piston 3, flexible sleeve 10, and certain features of end cap 2 are similar to those described in U.S. Pat. Nos. 4,787,607 and 4,784,376 which are incorporated herein by reference, and are of the type with which the improved external clamping band is primarily intended to be used.

In accordance with the invention, a plurality of radially extending ribs 32 are formed on top end wall 16 of end cap 2 and project radially beyond the outer generally annular cylindrical surface 34 of end cap sidewall 15 to provide a ledge or overhang 35 which extends circumferentially about the top of sidewall 15. In addition to forming circumferential ledge 35, ribs 32 also provide increased strength and rigidity to end cap 2 to reduce material creep.

Figure 5:
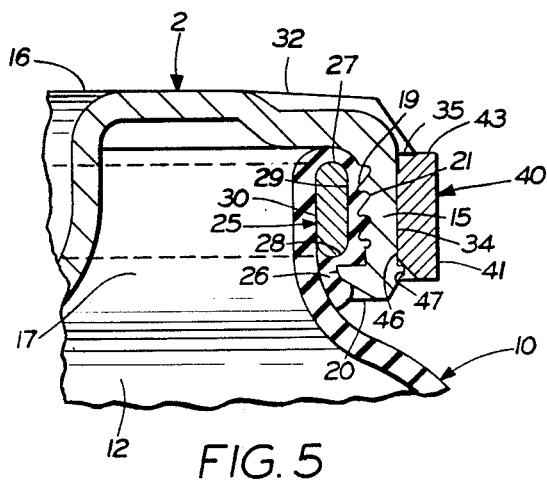
FIG. 5 is an enlarged fragmentary sectional view showing the external clamping band maintaining the trapped end of the flexible sleeve in sealing engagement between the internal sealing ring and annular sealing surface of the end cap.

In further accordance with the invention, an annular clamping band indicated generally at 40 (FIG. 3) is mounted in an abutting interference force-fit relationship with outer cylindrical surface 34 of sidewall 15 as shown particularly in FIGS. 2 and 5. Clamping band 40 preferably is formed of metal such as aluminum, and has a cylindrical outer surface 41, and a generally parallel inner surface 42, and a pair of opposed end surfaces 43 and 44. Preferably inner surface 42 is connected to the end surfaces by tapered surfaces 45 t provide lead-in areas to facilitate installation of band 40 on end cap 2 regardless of which end surface is at the top or bottom position when installed thereon. A smaller diameter annular rib 47 may be formed on a lower portion of sidewall surface 34 (FIG. 5) to form an annular recess 46 with rib overhang 35.

In the assembly of air spring 1, internal sealing ring 25 is placed within end cap open end 17 in a manner such as described in U.S. Pat. Nos. 4,787,607, and 4,793,598. Afterwhich lower open end 17 of end cap 2 together with attached ring 25 and sleeve 10 is forced through clamping band 40 until the top end surface of band 40 engages ledge 35 of ribs 32 properly positioning band 40 on the end cap. During installation of band 40, sufficient force is exerted thereon to force band 40 past rib 47 and into recess 46 formed between rib 47 and rib ledge 35. Also band 40 during installation compresses annular sidewall 15 of end cap 2 inwardly compensating for the slight outward radial expansion of the sidewall which occurs during the installation of sealing ring 25. This relationship forms an interference force-fit engagement between sidewall 15 and band 40 without deforming band 40.

Figure 6:
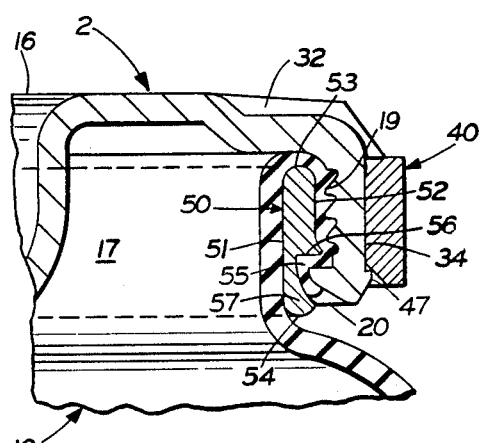
FIG. 6 is an enlarged fragmentary section view, similar to FIG. 5, showing the clamping band of the invention, in combination with a modified internal sealing ring.

A modified form of the internal sealing ring is indicated generally at 50 and is shown particularly in FIG. 6. Sealing ring 50 includes inner and outer smooth circumferential surfaces 51 and 52, connected by a convex smooth rounded top surface 53 and a rounded bottom surface 54. An annular recess 55 is formed in outer circumferential surface 52 adjacent lower bottom surface 54 and provides a somewhat elongated oval-shaped cross-sectional configuration with recess 55 being defined by an inwardly extending shoulder 56 and an outwardly curved lower end 57. Inwardly extending lip 20 of end cap 2 extends towards annular recess 55 and inwardly beyond outer circumferential surface 52 of sealing ring 50 compressing a portion of the sleeve end therebetween and providing the locking engagement between sealing ring 50 and end cap retaining lip 20 to prevent the pressure of flexible sleeve 10 from disengaging end cap 2 from its clamped engagement with the sealing ring as defined particularly in U.S. Pat. No. 4,787,607.

Annular clamping band 40 is engaged with outer surface 34 of sidewall 15 when used with modified sealing ring 50 and functions in the same manner as discussed above with respect to sealing ring 25.

Accordingly, the improved external clamping band for an air spring is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved external clamping band for an air spring is constructed and used, the characteristics of the construction, and the advantageous, new and useful results obtained; the new and useful structures, devices, elements, arrangements, parts, and combinations, are set forth in the appended claims.

We claim:

1. An air spring including an end cap for mounting the air spring on a structure; a piston member located in a spaced relationship from the end cap; a flexible sleeve; a fluid pressure chamber formed between the end cap and the piston member by the flexible sleeve sealingly connected at opposite ends thereof to the end cap and piston member; an annular sealing ring located within an open end of the end cap placing an end of the flexible sleeve in a state of compression against an annular sealing surface formed on an interior surface of an annular sidewall of the end cap to form a generally air-tight seal; and annular clamping band concentrically engaged with an outer annular surface of the annular sidewall of the end cap to restrict outward movement of said sidewall and subsequent loosening of the interior seal between the flexible sleeve and sealing ring, said band having inner and outer circumferential surfaces and a pair of opposed end surfaces with at least one of said end surfaces being connected to the inner circumferential surface by a tapered surface to facilitate the placement of the band about the sidewall of the end cap; and projection means formed on the end cap for restraining axial movement of the clamping band along the annular sidewall of end cap in first axial direction.

2. The air spring defined in claim 1 in which the clamping band and sealing ring are formed of metal.

3. The air spring defined in claim 2 in which the end cap is a substantially one-piece member formed of a high strength plastic.

4. The improved air spring as defined in claim 1 in which the annular sidewall of the end cap terminates in an inwardly extending annular lip which extends inwardly beyond an outer circumferential surface of the sealing ring to engage a portion of said one end of the flexible sleeve therebetween and to retain the sealing ring within the open end of the end cap.

5. The improved air spring defined in claim 1 in which the clamping band is in a nondeformed state.

6. The improved air spring defined in claim 1 in which the clamping band forms an interference force-fit engagement with the sidewall of the end cap.

7. An improved air spring of the type having an end cap for mounting the air spring on a structure, a piston member located in a spaced relationship from the end cap, a fluid pressure chamber formed between the end cap and the piston member by a flexible sleeve sealingly connected at opposite ends thereof to the end cap and piston member, and in which a continuous annular sealing ring is located within an open end of the end cap and places an end of the flexible sleeve in a state of compression against an annular sealing surface formed on an interior surface of an annular sidewall of the end cap to a form a generally air-tight seal; said improvement including an annular clamping band concentrically engaged with an outer annular surface of the annular sidewall of the end cap to restrict outward movement of said sidewall and subsequent loosening of the interior seal between the flexible sleeve and sealing ring; said clamping band having inner and outer circumferential surfaces and a pair of opposed connecting end surfaces, said end surfaces being connected to the inner circumferential surface by tapered surfaces to facilitate the placement of said band about the sidewall of the end cap.

8. The improved air spring defined in claim 7 in which the end cap is formed with a circumferential outwardly extending projection engageable with the clamping band for restraining axial movement of said band along the annular sidewall of the end cap means in a first direction.

9. The improved air spring defined in claim 8 in which the projection is a plurality of circumferentially spaced radially extending ribs formed integral with a top wall of the end cap.

10. The improved air spring defined in claim 7 in which a plurality of annular grooves are formed in the annular sealing surface of the end cap to assist in securing the compressed sleeve end between the sealing ring and sealing surface.

11. The improved air spring as defined in claim 7 in which an annular recess is formed in an outer circumferential surface of the sealing ring; and in which the annular sidewall of the end cap terminates in an inwardly extending annular lip which extends into said recess of the sealing ring to engage a portion of said one end of the flexible sleeve therebetween and to retain the sealing ring within the open end of the end cap.

12. An improved air spring of the type having an end cap for mounting the air spring on a structure, a piston member located in a spaced relationship from the end cap, a fluid pressure chamber formed between the end cap and the piston member by a flexible sleeve sealingly connected at opposite ends thereof to the end cap and piston member, and in which a continuous annular sealing ring is located within an open end of the end cap and places an end of the flexible sleeve in a state of compression against an annular sealing surface formed on an interior surface of an annular sidewall of the end cap to form a generally air-tight seal; said improvement including an annular clamping band concentrically engaged with an outer annular surface of the annular sidewall of the end cap to restrict outward movement of said sidewall and subsequent loosening of the interior seal between the flexible sleeve and sealing ring; and a circumferential outwardly extending projection formed on the end cap engageable with the clamping band for restraining axial movement of said band along the annular sidewall of the end cap in a first direction, said projection being a plurality of circumferentially spaced radially extending ribs formed integral with a top wall of the end cap.

13. An improved air spring of the type having an end cap for mounting the air spring on a structure, a piston member located in a spaced relationship from the end cap, a fluid pressure chamber formed between the end cap and the piston member by a flexible sleeve sealingly connected at opposite ends thereof to the end cap and piston member, and in which a continuous annular sealing ring is located within an open end of the end cap and places an end of the flexible sleeve in a state of compression against an annular sealing surface formed on an interior surface of an annular sidewall of the end cap to form a generally air-tight seal; said improvement including an annular clamping band concentrically engaged with an outer annular surface of the annular sidewall of the end cap to restrict outward movement of said sidewall and subsequent loosening of the interior seal between the flexible sleeve and sealing ring, said clamping band having inner and outer circumferential surfaces and a pair of opposed end surfaces; and a radially outwardly extending annular rib formed on the sidewall of the end cap with an end surface of the clamping band being engaged with said annular rib to retain said band in engagement with said sidewall.

14. An air spring of the type having an end cap for mounting the air spring on a structure; a piston member located in a spaced relationship from the end cap; a fluid pressure chamber formed between the end cap and the piston member by a flexible sleeve sealingly connected at opposite ends thereof to the end cap and piston member; a continuous annular sealing ring located within an open end of the end cap placing an end of the flexible sleeve in a state of compression against an annular sealing surface formed on an interior surface of an annular sidewall of the end cap to form a generally air-tight seal; an annular clamping band concentrically engaged with an outer annular surface of the annular sidewall of the end cap to restrict outward movement of said sidewall and subsequent loosening of the interior seal between the flexible sleeve and sealing ring; and an annular recess formed in an outer circumferential surface of the sealing ring, with the annular sidewall of the end cap terminating in an inwardly extending annular lip which extends into said recess of the sealing ring to engage a portion of said one end of the flexible sleeve therebetween to retain the sealing ring within the open end of the end cap.

15. The air spring defined in claim 14 in which the clamping band has inner and outer circumferential surfaces and a pair of opposed connecting end surfaces; and in which the end surfaces are connected to the inner circumferential surface by tapered surface to facilitate the placement of said band about the sidewall of the end cap.

* * * * *